United States Patent [19]

Tanimoto et al.

[11] 4,276,444
[45] Jun. 30, 1981

[54] SYNTHETIC-SPEECH CALCULATORS

[75] Inventors: Akira Tanimoto, Kashihara; Sigeaki Masuzawa, Nara; Shinya Shibata, Nara; Shinzo Nishizaki, Nara, all of Japan

[73] Assignee: Sharp Kabushiki Kaisha, Osaka, Japan

[21] Appl. No.: 68,702

[22] Filed: Aug. 22, 1979

Related U.S. Application Data

[62] Division of Ser. No. 877,883, Feb. 15, 1978, Pat. No. 4,211,892.

[30] Foreign Application Priority Data

Feb. 15, 1977 [JP] Japan .............................. 52/17798[U]
Feb. 21, 1977 [JP] Japan .............................. 52/19660
Feb. 25, 1977 [JP] Japan .............................. 52/20493

[51] Int. Cl.³ ............................ G10L 1/00; G06F 3/16
[52] U.S. Cl. ............................ 179/1 SM; 179/1 SF; 364/710
[58] Field of Search ............... 179/1 SM, 1 SG, 1 SF; 364/710, 200, 900

[56] References Cited

U.S. PATENT DOCUMENTS

| | | | |
|---|---|---|---|
| 3,855,461 | 12/1974 | Stockwell | 364/710 |
| 3,878,380 | 4/1975 | Tsuiki | 364/710 |
| 4,000,565 | 1/1977 | Overby et al. | 364/710 |
| 4,060,848 | 11/1977 | Hyatt | 179/1 SM |

Primary Examiner—Charles L. Atkinson
Assistant Examiner—E. S. Kemeny
Attorney, Agent, or Firm—Birch, Stewart, Kolasch & Birch

[57] ABSTRACT

A synthetic-speech calculator includes a keyboard consisting of digit keys and function keys and, if desired, or more mode selectors, a desired number of registers for storing numerical information entered by the depression of selected ones of the digit keys, a read-only-memory for storing a large number of digital codes as sound quantizing information, counter means for specifying the address of the memory so as to take a specific digital code out of the memory, a digital-to-analogue converter for converging the specific digital code taken out of the memory into an audible sound signal, and a loud speaker driven by the audible sound signal and producing an audible sound. There are further provided means for producing audible sounds indicative of not only numerical information but also its associated conditional information having a particular meaning with respect to that numerical information, for example, position information, index information, tabulation information, etc. Those numerical information and conditional information is derived in different audible forms. Specifically, a first sound indicates the most significant digit of the data, a second sound (monotone peep) separates the first sound from a third sound representing the data.

7 Claims, 8 Drawing Figures

| 0 | 0 | 1 | 2 | 3 | 4 | 5 | 6 |

"line"
six
• "peep"
one
two
three
four
five
six

SYNTHETIC-SPEECH CALCULATORS

This application is a divisional, of copending application Ser. No. 877,883, filed on Feb. 15, 1978, now U.S. Pat. No. 4,211,892.

BACKGROUND OF THE INVENTION

The present invention relates to an improvement in a synthetic-speech calculator.

A synthetic-speech calculator is well known in the art of calculators. The prior art synthetic-speech calculator was adapted such that respective ones of digit keys and function keys were assigned their own unique audible sounds. The operation results or entered information was not easily distinguished from other information not assigned a unique audible sound, for example, index information and tabulation information.

SUMMARY OF THE INVENTION

Therefore, it is an object of the present invention to provide an improvement in a synthetic-speech calculator which provides audible sounds indicative of not only numerical information but also conditional information having a particular meaning with respect to that numerical information.

In one preferred form of the present invention, a synthetic-speech calculator includes a keyboard consisting of digit keys and function keys, a desired number of registers for storing information entered by the depression of selected ones of the digit keys, a read-only-memory for storing a large number of digital codes as sound quantizing information, counter means for specifying the address of the memory so as to take a specific digital code out of the memory, a digital-to-analog converter for converting the specific digital code taken out of the memory into an audible sound signal, and a loud speaker driven by the audible sound signal and producing an audible sound. There are provided means for producing audible sounds indicative of not only numerical information but also conditional information having a particular meaning with respect to that numerical information, such as index information, position information and tabulation information. Sound quantizing digital codes indicative of such conditional information are previously loaded into the read-only memory.

In the case of a law-of-exponent calculator, distinction codes are interposed between the mantissa portion and index portion. When a decision circuit senses the development of the distinction codes, digital codes indicating exponent information are derived from the read-only-memory. Alternatively, in the case of a conventional calculator, a counter is provided to sense the most significant digit of numerical information contained within a piece of a random-access-memory and provide the output thereof for an address counter associated with the read-only-memory, enabling the loud speaker to produce audible sounds indicative of the most significant digit type position information. This makes it easy for the operator to register operation results in a correct position while these are being delivered in an audible form.

Further, pursuant to the teachings of the present invention, it is possible to produce audible sounds indicative of, for example; previously selected tabulation information as soon as a power switch is thrown or a specific key is manually depressed.

BRIEF DESCRIPTION OF THE DRAWINGS

Other objects and novel features of the present invention are set forth in the appended claims and mode of operation will best be understood from a consideration of the following detailed description of the embodiments taken in conjunction with the accompanying drawings, wherein;

DETAILED DESCRIPTION OF THE INVENTION

Figures 1, 2:
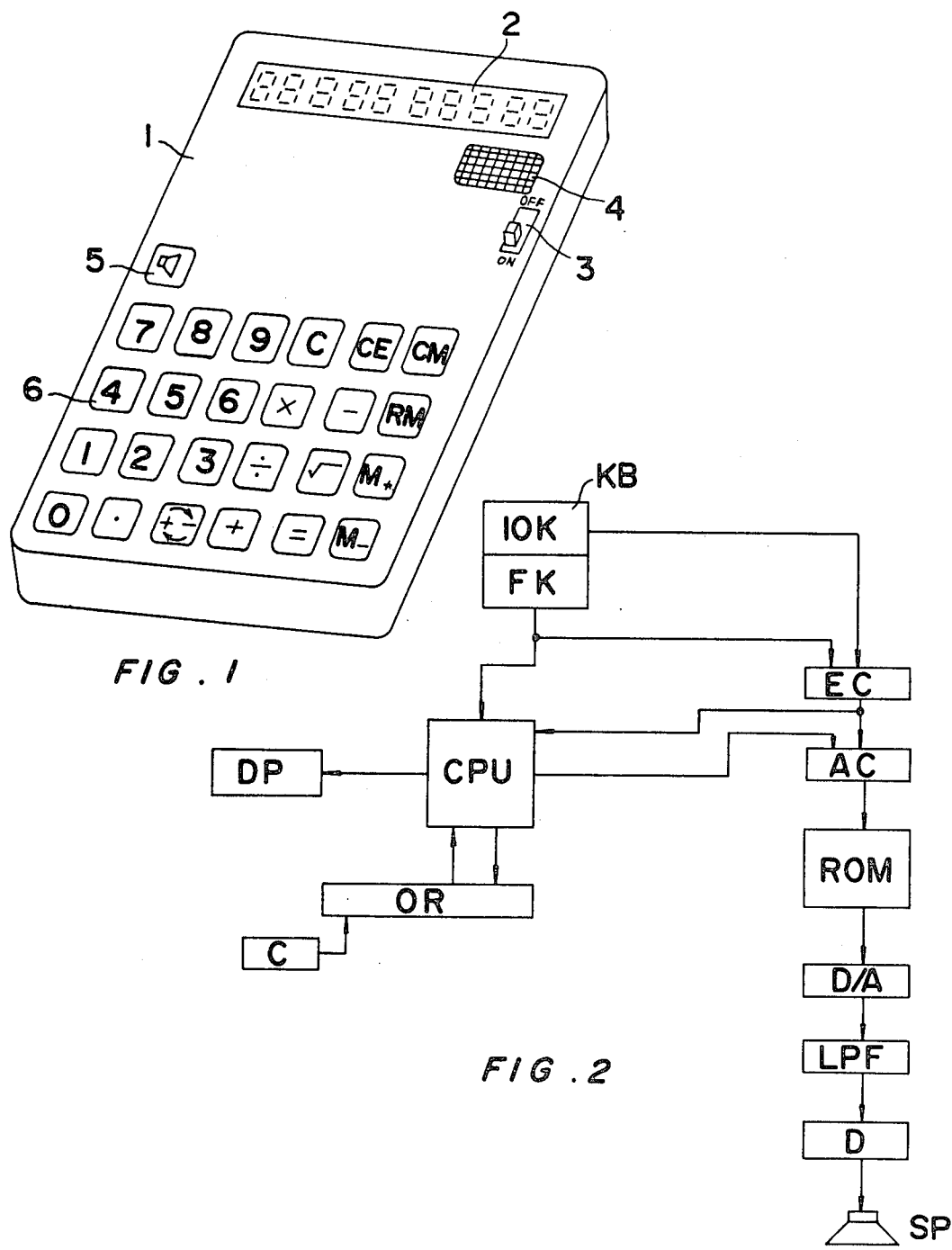
FIG. 1 is a perspective view of a synthetic-speech calculator embodying the present invention.
FIG. 2 is a block diagram of the synthetic-speech calculator shown in FIG. 1.

Referring now to FIG. 1 of the drawings, there is illustrated a perspective view of a synthetic-speech calculator embodying the present invention in the first embodiment which includes a body 1, a display 2, a power switch 3, a loud speaker 4, a sound key 5 available for indicating that keyed information or operation results are to be produced in an audible form, and digit keys and function keys 6. The speech synthesis technique is fully disclosed in many of U.S. Patents, for example, U.S. Pat. No. 3,102,165, SPEECH SYNTHESIS SYSTEM to Genung L. Clapper and U.S. Pat. No. 3,398,241, DIGITAL STORAGE VOICE MESSAGE GENERATOR to Lyle H. Lee.

FIG. 2 illustrates a block diagram of the synthetic-speech calculator. A keyboard KB contains a family of digit keys 10K, a family of function keys FK, etc. In response to the depression of a specific key, the corresponding signals are introduced into an encoder EC for code conversion. The outputs of the encoder EC are sent to a calculation circuit or central processor unit CPU and an output register OR. Keyed information and operation results are transferred from the output register OR to an address counter AC via the central processor unit CPU. The address counter AC is coupled with a read-only-memory ROM storing a large number of voice quantizing digital codes in advance. The address counter AC provides access to specific areas of the ROM containing selected ones of the voice quantizing digital codes. By the addressing of the ROM, the digital codes indicative of keyed information and operation results are picked up and converted into an audible form via a digital-to-analog converter D/A, a low-pass filter LPF, a speaker driver D and the loud speaker SP. As noted earlier, the ROM stores the digital codes that sample analog voice information containing vocal sounds, syllables, words etc., and quantize them at preselected amplitude levels. Fidelity of the reproduction from the ROM depends largely upon the number of samples and the number of quantizing levels. Amplitude quantum is a binary code and four-level quantizing requires two bits of binary codes, thereby enhancing fidelity. Sixteen-level quantizing with four bits of binary codes is substantially free of distortion.

Figure 3:
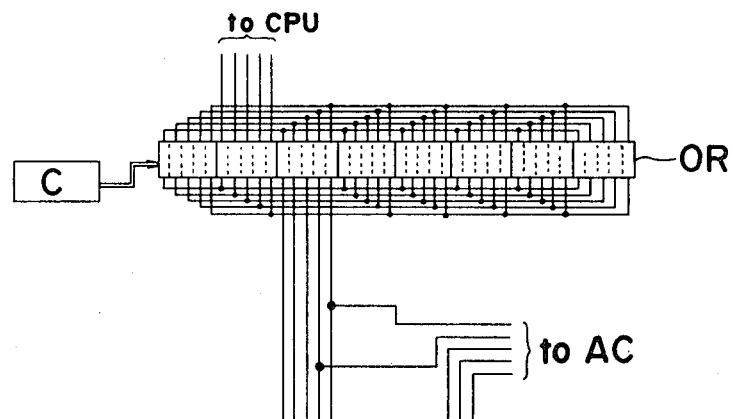
FIG. 3 (comprised of A and B) shows an example of the contents of a register in case of a law-of-exponent calculator.

According to a law-of-exponent calculator, numerical information consists generally of a mantissa and an index as shown in FIG. 3. In a first example (a), the mantissa portion is 1.2345 and the index portion is $10^{12}$ (the tenth power). Numerical information is stored in the output register OR and distinction codes such as blank codes and negative sign codes are interleft to establish a distinction between the mantissa portion and index portion. For example, five bits of "01111" are selected for the blank codes and ones of "11111" are selected for the negative sign codes apart from the code representation of numerical information.

These distinction code signals are supplied to the address counter AC. The blank codes "01111" specify the digital codes indicative of distinction sounds between the mantissa portion and index portion, followed by addressing the sound quantizing digital codes corresponding to a word "power" in the tenth power. The thus addressed digital codes are sequentially taken out of the ROM, producing audible sounds via the loud speaker beginning with the mantissa portion. Numerical information indicative of the index portion is then derived in the order of "twelfth", "power", and "of ten". For the example of (b), audible sounds "five", "point", "three", "six", "seven", "multiply", "power", "minus", "power", "of", and "ten" are produced in a sequence.

Figure 4:
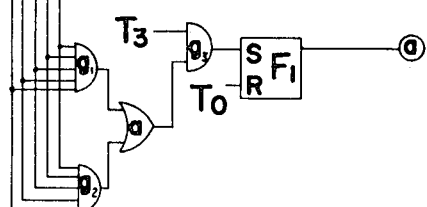
FIG. 4 is a circuit diagram which is effective in producing audible sounds indicative of exponent information.

FIG. 4 shows another preferred form of the present invention wherein a way to produce the mantissa portion in an audible form is different from that for the index portion. The components in the embodiment of FIG. 4 are given the same numbers as in FIG. 2 wherever possible in order to point up the close relationship. While the mantissa portion may be produced digit-by-digit in an audible form despite its digit significance, when producing audible sounds of the index portion. As mentioned previously, the register OR stores the blank codes "01111" and the negative sign codes "11111." Either of these codes are sensed via AND gates g1, g2, an OR gate O1 and an AND gate g3, placing a flip flop $F_1$ into the set condition. When the flip flop $F_1$ is in the set state, the set output ⓐ is developed to indicate that the next succeeding information relates to the index portion. The set output ⓐ of the flip flop $F_1$ is supplied to the ROM to select information while taking digit significance into consideration. In this instance, the sound "power" is necessarily produced after the delivery of audible sounds of the mantissa portion. It is obvious that the present invention is applicable to power calculations.

Figure 5:
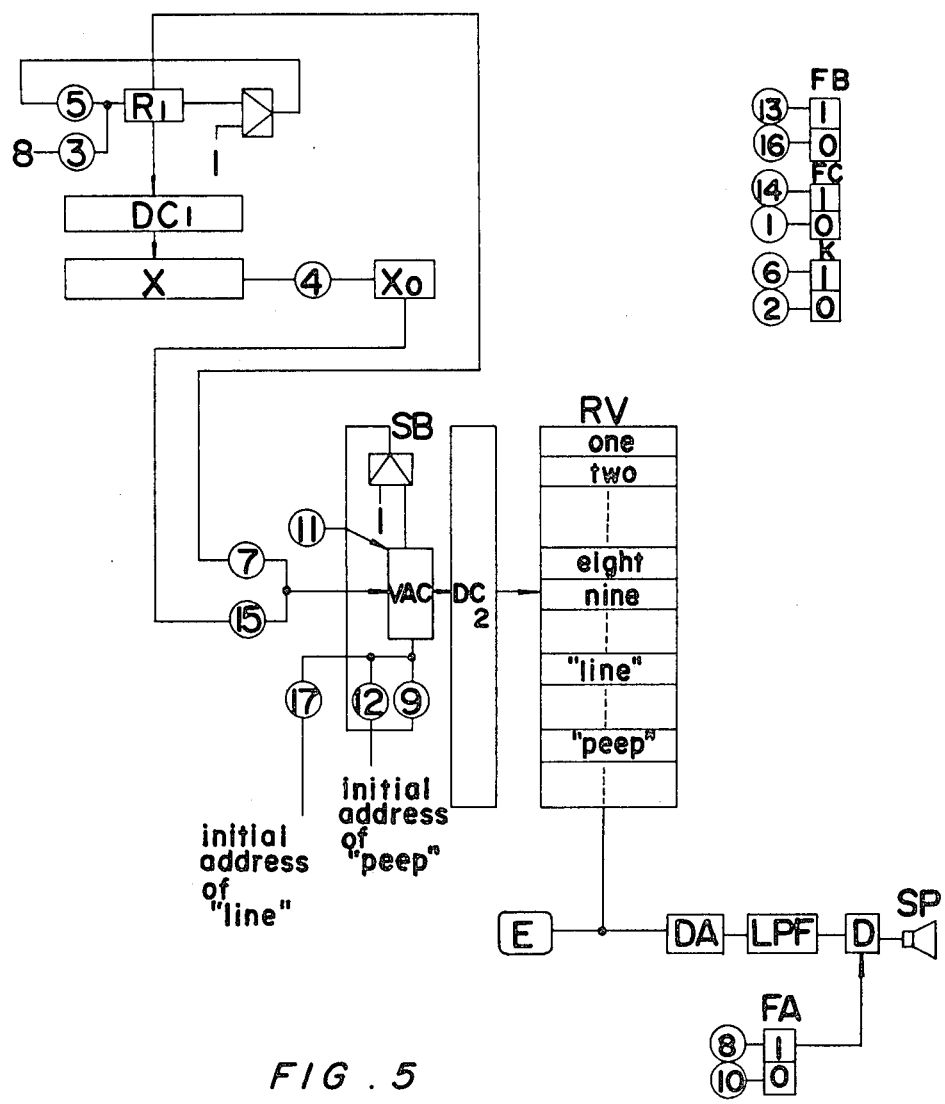
FIG. 5 is a block diagram showing another preferred form of the present invention.

FIG. 5 shows still another embodiment of the present invention the position of the most significant digit of numerical information is indicated in an audible form in advance to the delivery of that numerical information in the case of a conventional calculator. For example, if the most significant digit of numerical information is in the eighth digit position, then audible sounds "line", and "eight" are sequentially produced in accordance with the present invention. In FIG. 5, a register X stores numerical information and an address counter $R_1$ specifies the address of the register X beginning with the most significant digit thereof and ending with the least significant digit. A buffer register $DC_1$ stores the specific digit position of the register X which is addressed by the address counter $R_1$.

An address counter VAC sequentially addresses the ROM, producing audible sounds indicative of not only numerical information contained within the register X but also position information indicative of the position of the most significant digit position of that numerical information. For the purpose of the invention three decision circuits or latches $F_B$, $F_C$ and K are provided.

Figures 6, 7, 8:
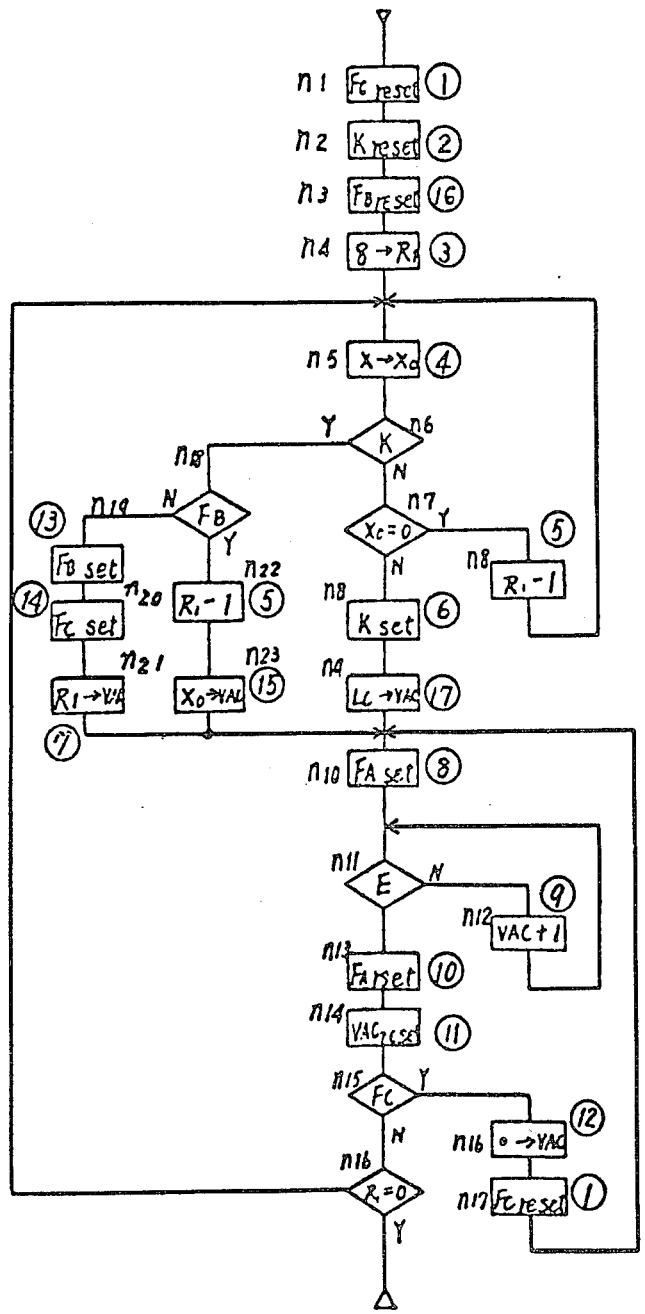
FIG. 6 is a flow chart provided for the purpose of explanation of operation of the embodiment shown in FIG. 5.
FIG. 7 shows an example of the contents of a register in the embodiment of FIG. 5.
FIG. 8 is an example of audible output forms in the example of FIG. 7.

Mode of operation of the synthetic-speech calculator shown in FIG. 5 will be described referring to a flow chart of FIG. 6. Assume now that numerical information contained within the register X is "123456" as in FIG. 7.

In the first place, the latches $F_C$, $F_B$ and K are reset for operation in the steps $n_1$, $n_2$ and $n_3$. The address counter $R_1$ is loaded with "8" in the step $n_4$ (that is, the most significant digit is at the eighth position). The step $n_5$ permits the contents of the register X specified by the address counter $R_1$ to be transferred into the buffer register $X_0$. Information at the eighth digit position of the register X is φ entered into the buffer register $X_0$. Because the latch K is initially in the reset state, the step $n_7$ is advanced where decision is effected as to whether $X_0=0$ to inhibit spurious display of upper "$0_S$". If $X_0$ is 0", the address counter $R_1$ is one reduced in the step $n_8$. Therefore, $R_1=7$. The step $n_5$ ($X \rightarrow X_0$) is returned where information at the seventh digit position of the register S is shifted into the buffer register $X_0$. These steps are repeatedly carried through. The seventh-digit information is entered into the buffer register $X_0$, proceeding toward the step $n_8$ because of $X_0=$). $R_1-1$ is effected with $R_1=6$. In the next step $n_5$ ($X \rightarrow X_0$) $X_0 \neq 0$ is established for the first time ($X_0$ receivers "1" at this time). The latch K is placed into the set state in the step $n_8$, followed by the step $n_9$. Under the circumstances the address counter VAC specifies the initial address. The procedure L→VAC in the step $n_9$ allows the initial address of an area of the ROM containing the sounds "line" to be specified. Thereafter, the flip flop $F_A$ is set in the step $n_{10}$, starting to produce audible sounds "line." The step $n_{11}$ deals with decision as to whether the output of the ROM is an END code, which is usually loaded at the end of each word. The address counter VAC keeps on incrementing in the step $n_{12}$ to complete the production of audiable sounds "line" until the END code is reached. Upon the END code sensed the flip flop $F_A$ is reset in the next step $n_{13}$ and the address counter VAC is also reset in the step $n_{14}$. The address counter VAC in the reset state does not specify any of the respective areas of the ROM. The latch $F_C$ is reset in the step $n_{15}$, followed by the step $n_{16}$ because of $F_C=0$. The procedure $R_1=0$ means decision as to whether the overall contents of the register X including the least significant digit position or the first digit position have been taken out, and a terminating requirement for the procedure 8→$R_1$ in the step $n_4$. The $n_5$ step is reverted to effect operation $X \rightarrow X_0$ when $R_1 \neq 0$. The address of the register X remains unchanged $R_1=6$ with the buffer $X_0$ loaded with "1". The latch K is set in the step $n_8$ to make up a sequence of the events $n_{16} \rightarrow n_{18} \rightarrow n_{19} \rightarrow n_{20}$. After setting the flip flops $F_B$ and $F_C$, $R_1 \rightarrow$VAC is achieved in the step $n_{21}$. $R_1=6$ specifies an area of the ROM containing voice "SIX". The chained steps $n_{10} \rightarrow n_{14}$ allows sounds "six" to be produced via the loud speaker. The latch $F_C$ in the step $n_{15}$ reveals that $F_C=1$ in the preceding step $n_{20}$, proceeding toward the steps $n_{15} \rightarrow n_{16}$. The procedure →VAC in the step $n_{16}$ is effected for the reason that a simple sound for example "peep" is to be interposed between "line six" and "numerical data." Thus, the initial address of an area containing a sound "peep" is specified. After $\rightarrow$VAC, the latch $F_C$ is reset in the step $n_{17}$ to return back to the step $n_{15}$. A sequence of the steps $n_{15} \rightarrow n_{16} \rightarrow n_5$ is carried through because $F_C$ in the reset state in the step $n_{17}$. $X \rightarrow X_0$ is a data input to the sixth digit position of the X register as ever. The steps $n_6 \rightarrow n_{18} \rightarrow n_{22}$ are effected so that the address counter $R_1$ for the X register is decremented with $R_1 = 5$. The procedure $X_0 \rightarrow VAC$ in the step $n_{23}$ is to specify the initial address of an area of the ROM containing audible sounds "one" which corresponding to "1" at the sixth digit position. Audible sounds indicative of numerical data are produced in the next succeeding steps $n_{10} \rightarrow n_{14}$.

This follows the steps $n_{15} \rightarrow n_{16} \rightarrow n_5$. Because $R_1 = 5$ in the procedure $X \rightarrow X_0$ the fifth digit position data "2" is introduced into the buffer $X_0$. The steps $n_{18}$ $n_{22}$ results in $R_1 - 1 = 4$. The step $n_{23}$ specifies the initial address of an area of the ROM containing sounds "two". The sounds "two" are produced in the steps are $n_{10} - n_{14}$. The above mentioned procedures are repeated such that the fifth digit data of the X register is introduced into the buffer $X_0$ in the step $n_5$. The development in the steps $n_6 \rightarrow n_{18} \rightarrow n_{22}$ results in $R_1 - 1 = 0$. The address counter VAC in the step $n_{23}$ specifies the initial address of an arc containing sounds "six" (the fifth digit position data). Audible sounds of the fifth digit position data are produced with advance to $n_{15} \rightarrow n_{16}$. $R_1 = 0$ halts all the procedures. FIG. 8 shows the order of the audible sounds produced from the loud speaker SP.

Occasionally, a calculator contains one or more mode selectors on the operation panel, for example, a tabulation selector, a normal/constant operation selector and a counting fraction selector. Through the use of the present invention it is possible to produce audible sounds indicative of the operation states of these selector. Furthermore, audible sounds indicative of the operation states of the mode selector may be produced once a power switch is thrown or a specific function key (e.g., a clear key $\boxed{C}$ is depressed.

While only certain embodiments of the present invention have been described, it will be apparent to those skilled in the art that various changes and modifications may be made therein without departing from the spirit and scope of the invention as claimed.

We claim:
1. A synthetic speech calculator comprising:
   means for entering data into said calculator; and
   audible sound generating means responsive to actuation of said means for entering for generating audible sounds in response thereto, wherein said audible sounds comprise,
   a first audible sound generated in response to actuation of said means for entering, said first audible sound indicative of a particular characteristic associated with said data,
   a second audible sound generated in response to the completion of generation of said first audible sound, said second audible sound being a monotone signal for separating selected groups of audible sounds, and
   a third audible sound generated in response to the completion of generation of said second audible sound, said third audible sound being indicative of said data entered via said means for entering.

2. A synthetic speech calculator in accordance with claim 1 wherein said audible sound generating means comprises:
   first storage means responsive to said means for entering for storing said data therein, and for storing said particular characteristic associated with said data;
   second storage means for storing a plurality of sound related digital signals therein, said sound related digital signals representing said data, said particular characteristic associated with said data, various numerical values, and said monotone signals, said data corresponding to selected ones of said sound related digital signals stored in said second storage means;
   extraction means responsive to said data stored in said first storage means for extracting said selected ones of said sound related digital signals from said second storage means corresponding to said data entered via said means for entering and stored in said first storage means, said extraction means extracting other sound related digital signals from said second storage means corresponding to said particular characteristic of said data and to said monotone signals; and
   means responsive to said sound related digital signals extracted by said extraction means for producing said first audible sound representing said particular characteristic associated with said data, said second audible sound representing said monotone signal in response to the completion of said first audible sound, and said third audible sound representing said data in response to the completion of said second audible sound.

3. A synthetic speech calculator in accordance with claim 2 wherein said data comprises numerical information and wherein said particular characteristic associated with said numerical information comprises the most significant digit of said numerical information.

4. A synthetic speech calculator in accordance with claim 3, wherein said first audible sound represents the most significant digit of said numerical information entered via said means for entering.

5. A synthetic speech calculator in accordance with claim 2 wherein said first storage means comprises a storage register means for storing said numerical information entered via said means for entering.

6. A synthetic speech calculator in accordance with claim 5 wherein said second storage means comprises a Read-only-Memory means for storing said sound related digital signals therein representing said numerical information, said most significant digit of said numerical information, and said monotone signals.

7. A synthetic speech calculator in accordance with claim 6 wherein said extraction means comprises an address counter means responsive to said numerical information entered via said means for entering for locating the address in said Read-only-Memory means of said sound related digital signals corresponding to said numerical information entered via said means for entering, corresponding to said most significant digit of said numerical information, and corresponding to said monotone signals, said audible sounds being generated in response to the extracted sound related digital signals.

* * * * *